United States Patent [19]
Northrop

[11] Patent Number: 5,472,472
[45] Date of Patent: Dec. 5, 1995

[54] ANIMAL WASTE BIOCONVERSION SYSTEM

[75] Inventor: Jere Northrop, North Tonawanda, N.Y.

[73] Assignee: Bion Technologies, Inc., Amherst, N.Y.

[21] Appl. No.: 120,164

[22] Filed: Sep. 10, 1993

[51] Int. Cl.$^6$ .................. C05F 3/00; C02F 3/02
[52] U.S. Cl. ............. 71/9; 71/10; 71/13; 71/15; 71/24; 210/602; 210/607
[58] Field of Search ............ 71/9, 13, 10, 15, 71/24; 210/616, 618, 673, 602, 607

[56] References Cited

U.S. PATENT DOCUMENTS

| | | | |
|---|---|---|---|
| 4,137,158 | 1/1979 | Ishida et al. | 210/16 |
| 4,772,307 | 9/1988 | Kiss et al. | 71/13 |
| 5,078,882 | 1/1992 | Northrop | 71/9 |

Primary Examiner—Ferris Lander
Attorney, Agent, or Firm—Crossetta & Associates

[57] ABSTRACT

The invention relates to a improved process for the biological transformation of phosphorus and nitrogen containing animal waste excrement into ecologically manageable materials by a process wherein solids in an aqueous slurry of the excrement are precipitated in a solids ecoreactor, the treated slurry is passed to a bioreactor zone where it is soluble phosphorus is precipitated with metallic salts, the slurry is aerobically and anaerobically treated to form an active biomass that actively bioconverts remaining soluble phosphorus and the aqueous slurry containing bioconverted phosphorus is passed to a polishing ecoreactor zone wherein the at least a portion of slurry is bioconverted to a beneficial humus material.

14 Claims, 2 Drawing Sheets

ANIMAL WASTE BIOCONVERSION SYSTEM

The invention relates to a improved process for the biological transformation of animal wastes into ecologically manageable materials.

BACKGROUND OF THE INVENTION

Unfortunately, the ecosystem of the planet upon which we live suffers from the advances of society. The air, water and even the earth itself become more polluted each day in a manner which tends to significantly decrease the life sustaining quality of the living biomass which remains in our ecosystem. One particularly distressing factor is the abuse being wrought upon the fresh water system of the earth by modern animal farming techniques and the polluting effects of intense concentrations of animal excrement containing phosphorus and nitrogen products.

Traditionally, waste excrement generated through animal farming has been used as a crop fertilizer. The traditional farmer gathers concentrations of excrement waste from animal barns, feeding stations and the like and typically spreads such on fields used for growing food for the animals to consume. Thus, in the traditional sense of ecologically balanced animal farming, animal waste excrement is allowed to decay in the field, the elements of the decay such as unstable phosphorus and nitrogenous products are taken up by growing crop plants and the crop plants are harvested for food to be eaten by the animals in an efficient recycle of elements which occurs over and over again to the benefit of all and perceived detriment of none.

Modern animal farming practices, particularly modern feedlot and dairy farming practices, have detrimentally effected the ecological balance of traditional animal farming. The efficiencies of animal farming have changed and modern techniques concentrate larger numbers of animals in smaller areas leaving larger amounts of waste excrement to be managed by distribution to smaller land areas. The larger amounts of food required by the larger number of animals and intense feeding practices of modern animal farming cannot typically be sustained by crop plant growth in the manure distribution fields utilized by the farmer and thus supplemental cattle feed containing concentrations of phosphorus and nitrogen must be imported from distant producers. Though animal food plants are typically still being grown on the manure distribution fields, the larger amounts of manure from larger numbers of animals provides fertilizer levels which cannot be fully assimilated by plant growth and the solids become unstabilized phosphorus and nitrogen rich beyond what may be appropriate to sustain flourishing field plant life.

Rain, falling on the phosphorus and nitrogen rich soil carry unstabilized nitrogen, phosphorus and other elements garnered from the waste excrement from the soil and with the flow of water through drainage ditches, groundwater currents and the like, eventually fresh water aquifers and other fresh water sources are found to be at higher phosphorus and nitrogen levels than is desired.

The problem of fresh water pollution by phosphorus and nitrogen content may be exacerbated by an accompanying concentration of toxic materials. Concentrations of toxic materials, which may have been used as insecticides or herbicides, including heavy metals and the like, may be typically part of the animal food intake and though not generally harmful to the animal or the animal product being farmed, end up being further concentrated in the animals excrement which is distributed to the field and eventually permeate the soil and are carried to the fresh water aquifers by distribution of the manure. The toxic materials are eventually carried along with phosphorus, nitrogen and heavy metals to the fresh water aquifer and the like thus spreading through the environment and further destabilizing the local ecosystem.

Various solutions which have been proposed to solve the ecological problem posed by modern animal farming, but have been judged to be incomplete or so specialized that they only serve to change or postpone the problem.

For example, it has been proposed that complex mechanical systems be installed to provide manageable manure slurries and that systems be installed by the farmer to enable spraying the manure slurry on differing land areas in a rotating manner to reduce the impact of concentration. It has also been proposed to isolate manure in depositories secure from rain water run-off until the decaying process has produced a concentrated desirable humus which then can be commercially sold or otherwise distributed to non-impacted localities. Both of these proposals present odor problems, require constant manpower to accomplish, do not significantly resolve the migration problem of unstabilized phosphorus and nitrogen and have not enjoyed significant success.

The present invention addresses the problems associated with animal waste excrement handling by providing a means to resolve ecological problems associated with the migration of unstabilized phosphorus and nitrogen, through the efficient bioconversion of waste excrement materials into stable, economically and/or ecologically beneficial materials.

Thus, it is an object of the invention to provide an ecologically suitable means for managing animal waste excrement.

It is another object to provide an improved process for the biological transformation of animal wastes, toxins or other waste materials into economically suitable materials.

It is a further object of the present invention to provide a process to create a biologically active, ecologically stable, humus material through the bioconversion of animal excrement.

It is a still further object of the present invention to provide a process to create a biologically active, and/or a nutrient-rich, organic soil.

These and other objects will be apparent from the following description of the invention.

SUMMARY OF THE INVENTION

The present invention comprises a process for the treatment of animal waste excrement which contain significant concentrations of soluble phosphorus and nitrogen materials and other organic biodegradable materials as measured by biochemical oxygen demand (BOD). The process achieves biological transformation of such materials into ecologically stable humus materials and/or nutrient rich organic soils which have economic commercial value and can safely be maintained in open storage. The process also manages water which may be combined with animal wastes and provides a clean, generally nutrient-free water discharge, which can be used to farm a high protein forage crop.

The process of the invention comprises treatment of the animal wastes in three primary subsystems or zones: a solids ecoreactor, a bioreactor, and a polishing ecoreactor.

In one embodiment of the process, wash and flushing water containing slurried animal wastes from an animal confining barn, penning area or the like is directed to a dynamic solids ecoreactor zone, comprising an influent end and an effluent end, which functions as a solids dewatering and biostabilization system. Generally, the solids ecoreactor zone comprises several holding cells surrounded by a containment berm. The slurried waste flows slowly from the influent end to the effluent end with manure solids being allowed to precipitate and become trapped within the solids ecoreactor wherein they are gradually bioconverted into a nutrient-rich, organic soil. A portion of the effluent from an effluent end of the solids ecoreactor may be recycled back to the influent end to the solids ecoreactor or is used to flush the barns, lanes or pen areas containing the confined animals, while another portion thereof is discharged to a bioreactor zone.

The bioreactor zone is generally comprised within a suitably sized pond environment or the like, which contains an inlet end for receiving liquid effluent from the solids ecoreactor and an outlet end for discharging treated effluent. The bioreactor zone contains a diverse microbial biomass with anaerobic, aerobic and facultative bacterial populations generally concentrated in corresponding zones with the anaerobic zone arranged close to the inlet end. A surface aerator is generally positioned in the bioreactor to enhance formation of aerobic and facultative microbial populations. Concentrated biological solids are generally recycled from the outlet end of the bioreactor zone back to the bioreactor influent end or to the influent end of the solids ecoreactor. The bioreactor is configured to discharge treated wastewater fluids, containing a multitude of active, naturally occurring bacterial species especially predisposed to nutrient capture and assimilation, to a polishing ecoreactor zone through its outlet end.

The polishing ecoreactor zone generally constitutes a flooded vegetative complex and comprises a wetlands environment made up of plants and microorganisms adequate to capture unwanted substances which may be comprised in the wastewater fluid discharged from the bioreactor. The polishing ecoreactor zone generally comprises multiple, distinct ecoreactor cells arranged such that liquid discharged from the bioreactor can be directed thereto in a variable and controlled manner. A preferred polishing ecoreactor zone generally comprises a suitable low lying field with a bermed perimeter and cross berms which create two or more liquid holding cells. The outlet of the bioreactor zone is configured to enable liquid discharge from the bioreactor zone to be directed to a first cell of the polishing ecoreactor zone capable of supporting various aquatic vegetation and from time to time allow discharge from the bioreactor zone to be directed to one or more other cells so that the first cell may be dried, harvested and eventually reactivated with discharge from the bioreactor.

In the process of the invention, the solids ecoreactor zone, the bioreactor zone and polishing ecoreactor zone further comprise secondary subsystems which are cyclically connected by a series of recycle flows and organism movements to bioconvert materials contained therein.

The bioconverted materials produced by the process can be desirable and ecologically beneficial end products comprising entrained nitrogen and phosphorus such as biologically active and highly beneficial humus materials and/or nutrient rich organic soils. Generally, water effluent from the polishing ecoreactor zone is sufficiently pollutant free to allow discharge thereof into a natural receiving water or utilization as flushing and/or washing water in the animal barn or penning areas.

A chemical addition/mixing subzone is generally associated with the bioreactor or solids ecoreactor zone. Such subzone is positioned for mixing metallic salts with the waste effluent for the removal of precipitatable phosphorus and generally is positioned at about the influent end of the bioreactor or ecoreactor.

Generally, the function of the chemical addition means is to expedite removal of precipitable phosphorus. It should be understood that a chemical addition/mixing subzone may be associated with the recycle water such as in a recycle water holding tank or the like which may be used for flushing barns or the like.

DETAILED DISCLOSURE OF THE INVENTION

The novel process of the invention involves bioconversion of animal wastes into economically desirable or ecologically neutral materials. The novel process utilizes a combination of chemical precipitation and natural living systems such as microbes and plants to achieve bioconversion and exploits the creative capability of living organisms to adapt to achieve the bioconversion of nitrogen and phosphorus containing materials.

The three primary zones, e.g. solids ecoreactor, bioreactor and polishing ecoreactor, function as a part of an integrated, multiple recycling input/output flow through system, with removal of precipitatable phosphorus at desired locations being mediated by a chemical addition subsystem.

The process functions under the overall guidance of complementary, operational control strategies. One control strategy comprises imposing general biological control, based on extension of the maximum entropy principle, to optimize the system. Such strategy emphasizes the moderation of dynamic environmental extremes, the maintenance of suitable nutritional balances, and the artificial alteration of physical, chemical and biological sub-environments. Another control strategy comprises controlling the communication/transport of fluids so as to optimize the covariance of all information, material and chemical exchanges among various components of the system as a whole.

Figure 1:
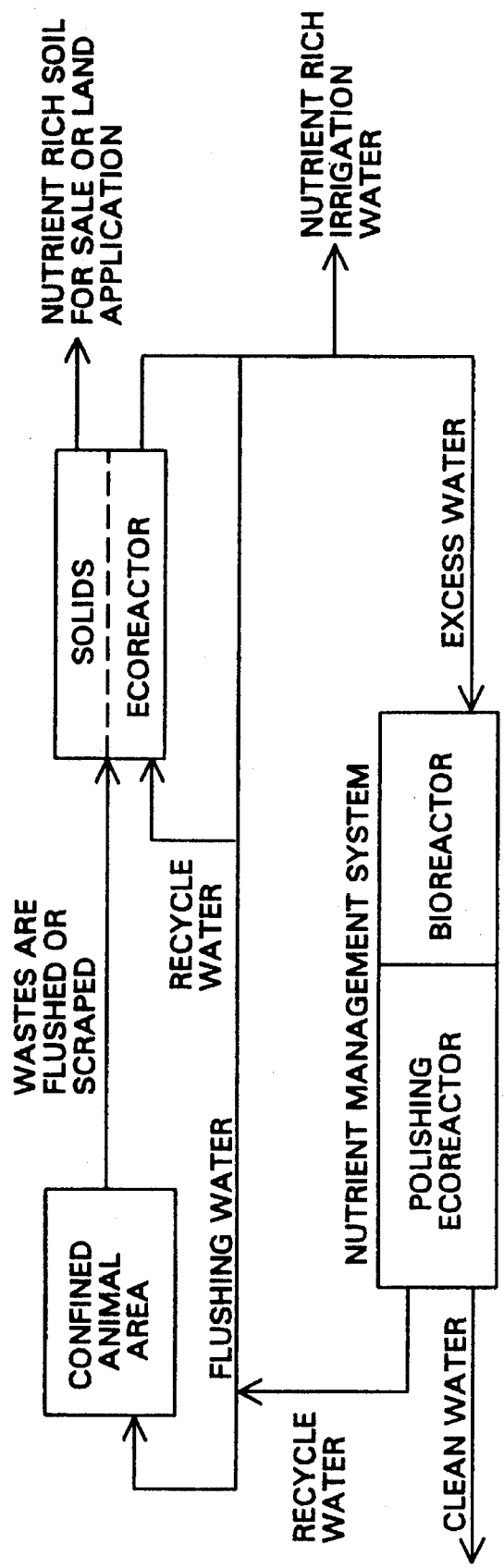
FIG. 1 comprises a flow diagram of an embodiment of the process of the invention.

Referring now to FIG. 1. Therein, manure, in an aqueous slurried form, is generally introduced into the solids ecoreactor from a collection pit or the like that receives the manure from the barn, penning area or the like confined animal area. Two or more parallel solids ecoreactor zones are generally utilized so that influent flow may be diverted from one to the other to facilitate cyclical drying and harvesting of bioconverted solids within a zone.

Though a solids ecoreactor may be configured in a variety of shapes, preferably it is shaped as a long, narrow rectangular structure having an influent end at one end and an effluent end at the other. A solids ecoreactor may be divided into a number of cells separated by low berms which tend to resist the flow of precipitated solids from cell to cell. In one configuration a rectangular shaped ecoreactor is divided into a series of triangular shaped cells.

The floor of a solids ecoreactor, or of an individual cell comprised in the reactor, is generally graded from the influent end to the effluent end to facilitate gravity water drainage from a first cell to the next. In a preferred embodiment an underground drainage system comprising a layer of porous material, e.g. sand or gravel, is constructed under the floor of the cells and thereunder, catch basins and piping are arranged to collect and remove water from the reactor. This water is generally recycled back to a recycle water holding tank at the head of the barn, to the head of the system, or may be directed to the bioreactor. A synthetic or earthen liner is preferably utilized in the solids ecoreactor to prevent groundwater contamination.

The end products of the solids bioconversion process in the solids ecoreactor are generally dry, 35% solids or greater, nutrient-rich, stable organic soils with variable and controllable nutrient contents. The materials generated in the solids ecoreactor will contain variable and controllable chemical and biological compositions which will make them suitable and valuable for a variety of commercial and agricultural uses. The variety of nutrient compositions in the organic soils which can be produced by this process ranges from about 0.05 percent each for nitrogen, phosphorus, and potassium on a dry weight basis to greater than about 3 percent each for the same nutrients. These materials can be further mixed with a variety of other inorganic materials such as sand, clay, gravel, etc., to produce an even wider variety of different soils useful in agricultural, landscaping, forestry and ecological applications.

A constant source of high nutrient water is generally necessary to the operation of the solids ecoreactor and a large fraction of the water that leaves the solids ecoreactor will become part of a solids ecoreactor recycle loop. Solids ecoreactor effluent is either returned to the barn to be used in a barn flushing system or to a pit area adjacent to the head of the solids ecoreactor, when a barn scraping system is utilized. In the latter case the scraped manure is deposited in a pit area where it is mixed with the recycled water and then directed into the influent end of the solids ecoreactor.

Nutrient rich aqueous effluent from the ecoreactor zone is directed to the bioreactor zone. The bioreactor zone comprises a structurally contained and physically controlled microbial growth zone. Its principle function is to attach undesirable soluble materials such as soluble phosphates, nitrates and toxins to living aggregates of biomass so as to further the bioconversion process through the association of the undesirable material with microbial physiological processes.

A bioreactor zone generally comprises multiple diverse sub-environments, including aerobic zones, anoxic and/or anaerobic zones, facultative bacteria zones, mixing zones, quiescent zones and settling zones, and it usually comprises one or more recycles among the various zones. Suitable bioreactor zones generally comprise a pond or the like having a suitable lining of artificial or natural materials that generally resist the flow of fluids therethrough and maintain the integrity of the bioreactor.

Preferably the bioreactor zone is configured to maintain at least a minimal flow and may comprise an agitating means or the like and/or an aeration means. The bioreactor zone is designed to contain both aerobic and anaerobic subzones and no attempt is made to achieve effluent clarity from the bioreactor zone, as excess nutrient or other contaminants which may be generated are typically recycled back to the solids ecoreactor or discharged to the polishing ecoreactor zone in the process of the invention. Effluent from the bioreactor zone is discharged to the polishing ecoreactor zone.

The polishing ecoreactor zone generally takes the form of a series of constructed wetland cells containing a wide variety of microorganisms, plants and animals. Generally, the plant environment comprises wetland plants indigenous to the area in which it is constructed, and the microorganisms that predominate are generated in the bioreactor and are the products of survival and growth therein. The polishing ecoreactor zone may be contained in a greenhouse like structure but typically is exposed to the weather and open to the natural environment. The principle function of the polishing ecoreactor zone is the bioconversion and biofiltration of wastewater discharged from the bioreactor, which results in the production of an ecologically beneficial humus material, which can support a high protein forage crop and generally provides a filtered nutrient-free water.

The build-up of humus within the polishing ecoreactor zone occurs gradually through the interaction of the many diversified microorganisms and wetland plants with the biomass of the influent wastewater. The root and stem systems of the various indigenous plants assist in capturing the microbial solids and provide extensive surface area for further microbial growth. In turn, the entrapped microbial biomass provides a growth medium and substrate for the developing plant and animal biomass. As plants and animals die or are harvested, the organic material so produced becomes mixed with the living plant, animal and microbial biomass to produce a balanced humus material comprising complexed phosphorus and nitrogenous materials from the animal waste excrement.

Humus material generated in the polishing ecoreactor zone can contain a chemical and biological composition which will make it suitable and valuable for commercial use. It can be mixed with a variety of other inorganic materials such as sand, clay, gravel, etc., to produce a variety of different soils useful in agricultural, landscaping, forestry, and ecological applications.

In addition to treating the solids biomass from the bioreactor, the bioreactor and/or polishing ecoreactor zones can provide additional treatment of materials which may be contained in an aqueous and/or gaseous phase in existing fields. Runoff water from rainfall and the like of adjacent fields containing high concentrations of phosphorus and/or nitrates can be directed to the bioreactor and/or polishing ecoreactor zones wherein the existing biomass, together with plants, animals and especially microorganisms therein will assimilate and act upon the phosphorus and nitrates, thereby furthering the bioconversion process. In situations requiring greater nutrient reductions, chemical addition can also be utilized in conjunction with the polishing ecoreactor.

Fluid movement within the various zones can be controlled and directed by appropriate placement and operation of various collection and distribution pumps, pipes, wells, etc. In general, it is preferred to isolate the material to be bioconverted to prevent migration into the surrounding environment, particularly when the bioreactor and/or ecoreactor zones are not isolated from the general ground soil. Typically the bioreactor and/or ecoreactor zones are easily isolated using an artificial or natural, impervious liner.

The bioreactor and ecoreactor zones can be connected in a variety or ways. Typically, the bioreactor zone receives a liquid influent stream of water pumped from the solids ecoreactor and/or liquids such as waste water, runoff and the like. The liquid effluent of the bioreactor zone and any excess biological solids generated by the bioconversion activity occurring within the bioreactor zone is generally transferred to the polishing ecoreactor, or, back to the solids ecoreactor zone, for further bioconversion using a system of weirs, pumps, channels and the like readily apparent to one of skill in the art.

The process of the invention may further comprise a georeactor zone. Such zone generally comprises a filtering means such as varying layers of sand and gravel and the like and can be positioned under the polishing ecoreactor such that aqueous effluent from the final cells of the polishing ecoreactor will seep down into and through the georeactor zone and further filter aqueous effluent before its addition to the groundwater. Effluent from the polishing ecoreactor zone may also be directed to a water holding area where it can be recycled for use in cleaning and flushing the animal barns and/or pens, washing animals, or for other uses such as field and crop irrigation.

The final aqueous effluent from the polishing ecoreactor area will typically constitute appropriate quality for discharge into a receiving water of the surrounding environment. The wetland system constituting the ecoreactor zone provides effluent polishing and can constitute an appropriate environment for biomonitoring. A wide variety of native and other indicator plants and animals are maintained in this wetland in such a manner so as to provide continuous monitoring of effluent quality and compatibility with the receiving environment.

Figure 2:
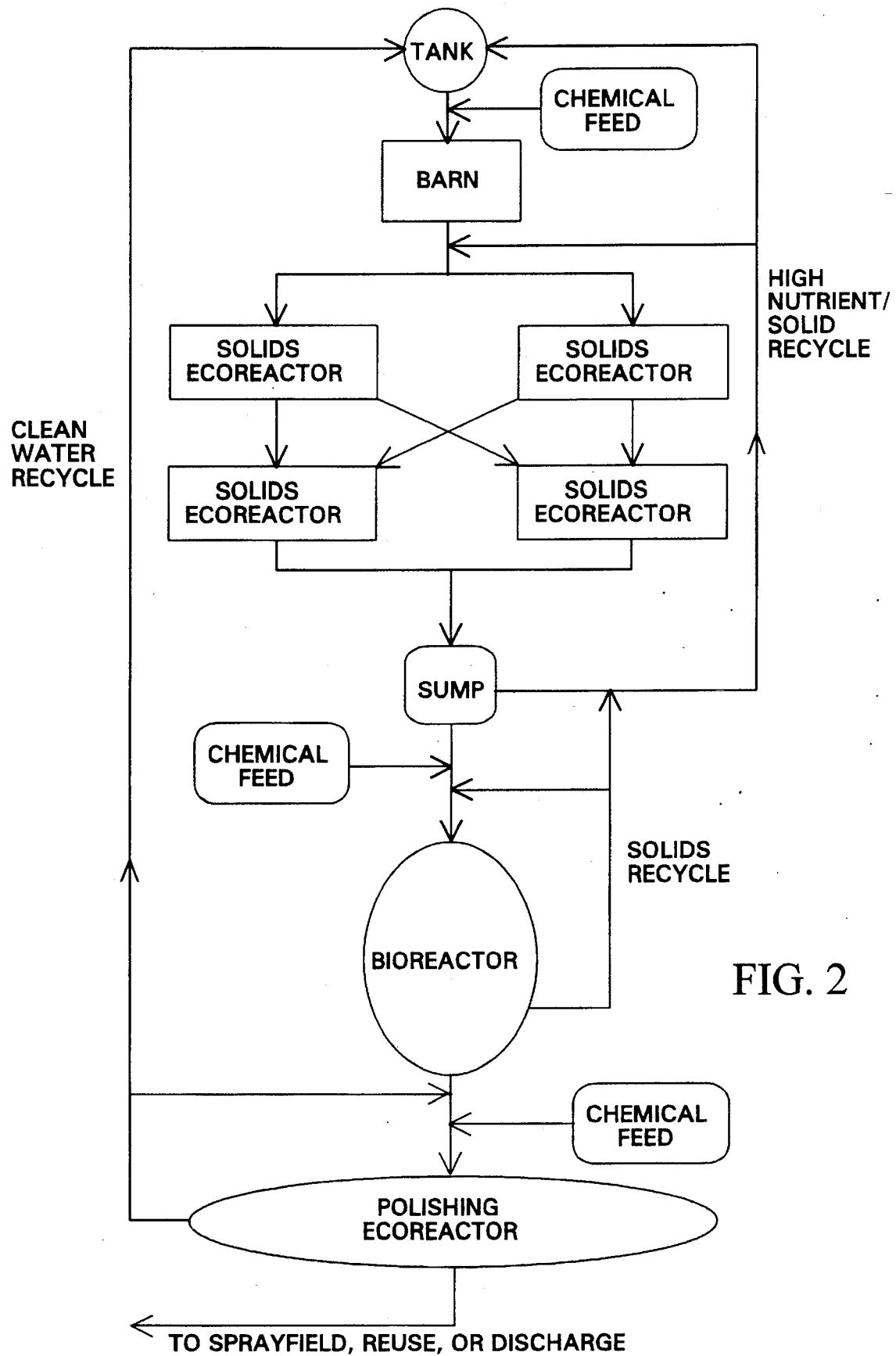
FIG. 2 comprises a flow diagram of another embodiment of the process of the invention.

FIG. 2 illustrates an embodiment of the process of the invention configured as associated with a typical dairy cattle milking and feeding station operation. Therein, animal wastes are initially flushed along with typical barn debris such as bedding, uneaten feed, and the like, to a collection pit (not shown), wherein some of the fibrous matter settles out. A fluid slurry, high in nutrients and solids flows from the pit to a solids ecoreactor zone of the invention. The collection pit is not a necessary element of the invention but is preferred in that it provides a convenient means to move manure materials into the treatment zone.

The solids ecoreactor zone generally comprises two or more areas arranged for alternating use so that solids can quiescently settle and/or be removed between cycles. Generally, the solids ecoreactor zone is lined with an impermeable liner or the like and comprises an outlet therefrom which freely allows the flow of reduced solids containing fluid therefrom. The effluent from the solids ecoreactor is collected in a pumping sump and is typically recycled back to a holding tank or flush tank for use in flushing the barn, pens, etc., or may be recycled back to the influent end of the solids ecoreactor to move manure solids scraped from barns or pens or the like.

Generally, chemical precipitant is added in the ecoreactor zone or together with the liquid stream from a separator station to maximize precipitation of phosphorus and nitrogen complexes.

The bioreactor zone generally comprises a pond-like environment containing an aerating means at or near the effluent discharge end thereof. The presence of aeration tends to foster creation of an aerobic zone within the bioreactor zone through air bubbling up which allows for zones having different dissolved oxygen levels and hence favors different microbial and other organismal populations. Natural currents created through the addition of influent and the agitating action of the aerator cause movement of the influent toward the aerator and development of an active biomass.

The bioreactor zone itself ranges from one to 10 meters deep and is typically lined with an impervious liner such as plastic, clay or the like. Generally, provision is made for the bioreactor zone to receive high phosphorus and/or nitrogen containing influent collected from adjacent fields such as through rain run-off and the like. Solids settling in the bioreactor zone can be periodically removed and combined with the solids from the solids ecoreactor.

The effluent from the aerobic section of the bioreactor zone is cycled into a cell of the ecoreactor zone, which is preferably located adjacent the bioreactor zone. The ecoreactor zone contains maximally diversified populations of plants, animals, and microorganisms, all living in an extensive variety of different sub-environments. Water depth within the ecoreactor zone generally varies from over about 4 meters to less than about one centimeter.

One or more of the cells of the ecoreactor zone may comprise a georeactor zone thereunder or adjacent thereto such that water is allowed to seep from the ecoreactor zone through the georeactor zone to the groundwater aquifer.

The ecoreactor zone is generally composed of separate but connected cells which allows a given cell to serve as a primary solids accumulator. When the cell becomes full, a second cell is converted into the primary solids accumulator and so on. The effluent from the ecoreactor zone thereafter flows to a water holding area where it is typically of sufficient quality to be non-threatening to the environment.

As an individual cell becomes mature, its organismal population also goes through a natural evolution. The sludge which is initially deposited is subjected to a series of actions by other organisms. Plant growth becomes more extensive and animal populations emerge which act on the steadily accumulating organic plant material. All of this results in gradual bioconversion of the bioreactor sludge into an organic humus material.

After a suitable period of time, usually from three to six years, a cell may be disconnected from the hydraulic flow pattern of the ecoreactor zone, allowed to dry and the plant and humus material collected for their value as fertilizer, soil enhancer, plant growth medium or the like.

I claim:

1. A process for the bioconversion of soluble and suspended organics, from animal waste excrement, comprising introducing a nutrient rich aqueous slurry of grazing animal waste excrement comprising straw, entrained organic solids, and soluble and insoluble phosphorus and nitrogen values into a solids ecoreactor zone; precipitating at least part of said entrained organic solids and insoluble phosphorus and nitrogen values from said aqueous slurry in said solids ecoreactor zone; treating said aqueous slurry from which organic solids have been precipitated with a metallic salt and precipitating a metal complex comprising soluble phosphorus values therefrom; introducing aqueous slurry from which at least part of said organic solids and soluble and insoluble phosphorus values have been precipitated into a bioreactor zone comprising an aerobic zone and an anaerobic zone; treating said aqueous slurry from which organic solids and soluble phosphorus values have been precipitated in said anaerobic zone of said bioreactor zone; treating anaerobically treated slurry from said anaerobic zone in said aerobic zone of said bioreactor zone; forming within said aerobic zone of said bioreactor a biomass and aqueous slurry containing enhanced facultative bacteria therein by actively bioconverting at least a portion of soluble phosphorus contained within said aqueous slurry; transporting biomass containing enhanced facultative bacteria therein from said aerobic zone of said bioreactor to said solids ecoreactor zone; transporting aqueous slurry containing bioconverted phosphorus from said aerobic zone of said bioreactor to a polishing ecoreactor zone; bioconverting at least a portion of said biomass transported to said solids ecoreactor zone to a beneficial humus material within said ecoreactor; and, recovering water from said polishing ecoreactor zone.

2. The process of claim 1 wherein the environment of the bioreactor in which the soluble phosphorus material has been introduced is periodically modified to diversify the activity of identified bioconverting subsystems.

3. The process of claim 2 wherein a modified environment generates different sub-environments within a subsystem.

4. The process of claim 2 wherein the environment of a primary zone in which the soluble phosphorus material is being introduced in said bioreactor zone is periodically modified through the addition of nutrients and the adjustment of size, location and functionality of sub-environments within the subsystems.

5. The process of claim 1 comprising fluid recycles between multiple subsystems within the ecoreactor zone to enhance and encourage organism movement among combinations of subsystems and sub-environments.

6. The process of claim 1 wherein aqueous recovery from the bioreactor zone is introduced into a polishing ecoreactor zone comprising plants, animals, microorganisms which are indigenous to a local geographic environment.

7. The process of claim 6 wherein said ecoreactor zone comprises indicator organisms, which respond in growth, color or other characteristic to the presence or absence of generally known levels of phosphorus or nitrogen.

8. Humus material produced in the polishing ecoreactor by the process of claim 1.

9. An organic humus material produced in the solids ecoreactor by the process of claim 1, such material containing from about 0.05 percent to about 3 percent each of nitrogen, phosphorus, and potassium calculated on a dry weight basis.

10. An organic humus material produced in the solids ecoreactor by the process of claim 1, such material containing from about 0.5 percent to about 3 percent of nitrogen, and from about 0.2 percent to about 3 percent of phosphorus and potassium calculated on a dry weight basis.

11. The process of claim 1 wherein said aqueous slurry is treated with a metallic salt and soluble phosphorus is precipitated in said bioreactor zone.

12. A process for the production of high nitrogen and phosphorus content soil, comprising forming an aqueous slurry of high solids animal waste excrement containing entrained soluble and insoluble phosphorus and nitrogen values by combining said excrement with a first aqueous fluid; introducing the combined aqueous slurried excrement into a first solids ecoreactor zone; settling solids from the combined aqueous slurry and recovering a phosphorus and nitrogen values containing second aqueous fluid from which solids have been settled; combining said phosphorus and nitrogen values containing second aqueous fluid with said first aqueous fluid and forming a further aqueous slurried animal waste excrement thereof with high solids animal waste excrement containing phosphorus and nitrogen; introducing said further aqueous slurried excrement into said first solids ecoreactor zone; settling solids from said further aqueous slurried excrement; repeating said process until settled solids in said first solids ecoreactor zone comprise a high nitrogen and phosphorus content and recovering said high nitrogen and phosphorus content solids.

13. The process of claim 12 wherein said recovered phosphorus and nitrogen containing aqueous fluid from which solids have been settled is treated with a metal salt to precipitate phosphorus therein prior to recycle.

14. An organic soil material produced in the solids ecoreactor by the process of claim 12, such material containing from about 0.5 percent to about 3 percent of nitrogen, from about 0.1 percent to about 3 percent of phosphorus and from about 0.2 percent to about 3 percent of potassium, calculated on a dry weight basis.

* * * * *